United States Patent [19]
Piper et al.

[11] Patent Number: 5,305,642
[45] Date of Patent: Apr. 26, 1994

[54] PORTABLE HIGH PRECISION PRESSURE TRANSDUCER SYSTEM

[75] Inventors: Thomas C. Piper; John P. Morgan; Norman J. Marchant, all of Idaho Falls; Steven M. Bolton, Pocatello, all of Id.

[73] Assignee: The United States of America as represented by the United States Department of Energy, Washington, D.C.

[21] Appl. No.: 868,149

[22] Filed: Apr. 14, 1992

[51] Int. Cl.[5] .............................................. G01L 11/00
[52] U.S. Cl. ....................................... 73/702; 73/301; 73/708
[58] Field of Search ................. 73/708, 702, 298, 299, 73/301, 302

[56] References Cited
U.S. PATENT DOCUMENTS
5,138,886  8/1992  Tilley, Sr. ............................. 73/708

Primary Examiner—Donald O. Woodiel
Attorney, Agent, or Firm—Bradley M. Smith; Thomas G. Anderson; William R. Hoser

[57] ABSTRACT

A high precision pressure transducer system for checking the reliability of a second pressure transducer system used to monitor the level of a fluid confined in a holding tank. Since the response of the pressure transducer is temperature sensitive, it is continually housed in an battery powered oven which is configured to provide a temperature stable environment at specified temperature for an extended period of time. Further, a high precision temperature stabilized oscillator and counter are coupled to a single board computer to accurately determine the pressure transducer oscillation frequency and convert it to an applied pressure. All of the components are powered by the batteries which during periods of availability of line power are charged by an on board battery charger. The pressure readings outputs are transmitted to a line printer and a vacuum florescent display.

11 Claims, 2 Drawing Sheets

PORTABLE HIGH PRECISION PRESSURE TRANSDUCER SYSTEM

CONTRACTUAL ORIGIN OF THE INVENTION

The United States Government has rights in this invention pursuant to Contract No. DE-AC07-84-ID-12435 between the United States Department of Energy and Westinghouse Idaho Nuclear Company.

BACKGROUND OF THE INVENTION

The use of a differential pressure transducer to measure the difference in pressure between a bubbler probe located at the bottom of a liquid filled holding tank and the air pressure above the liquid of the holding tank is one method often used to determine if the depth of the liquid in the tank is changing and thus, if the holding tank is leaking liquid. Use of this type of liquid depth monitoring system can, over the short term, determine changes in the liquid depth of as little as 0.06 inches; this degree of accuracy becomes particularly important when hazardous liquid waste is contained in the holding tank. Over the long term, the accuracy of a depth monitoring system of this type can degrade due to changes in the specific gravity of the liquid brought on by such occurrences as the precipitation of solids from within the fluid; however, this effect is minimal when using a differential pressure system to determine tank leaks since the pressure changes are monitored on a short term basis. But even in the short term, it is necessary to check the calibration of the pressure transducer associated with the monitoring system to insure the reliability of the transducer.

The differential pressure transducer used both by the applicants in their invention and as part of the instrumentation used to monitor the depth of the fluid in the holding tank is based on the very repeatable changes which occur in the output frequency of a quartz crystal in response to an applied pressure. The pressure transducer common to both of these systems experiences a frequency drop of approximately 4 kHz when a pressure of 20 psi is applied to the differential pressure transducer crystal.

The output of the differential pressure transducer used in both applicants' invention and in the monitoring system for the holding tank is, also, temperature dependent, and as a result, when the pressure transducer is exposed to changes in the ambient temperature, the output frequency of the pressure transducer under a set load varies in response to these temperature changes. Thus, in order to insure uniform pressure differential readings, the preferred method of maintaining the pressure transducer would be in a uniform temperature environment.

The holding tank is at a remote location with respect to the source of calibration. Moving the holding tank differential pressure transducer to the calibration location would expose the transducer to temperature cycles resulting in undesirable calibration changes and changes in the calibration fit. As a result, it would be desirable to monitor the accuracy of the holding tank transducer in place. One way of accomplishing this is through the use of a portable high precision pressure measurement system for which the environmental temperature is controlled at all times.

Accordingly, it is an object of this invention to provide a portable high precision pressure measurement system which is capable of checking the performance of the pressure transducer associated with a holding tank monitoring system on site rather than having to move the monitoring system transducer to a remote location for testing.

A further object of this invention is to provide a constant temperature environment for the differential pressure transducer associated with the portable high precision pressure measurement system.

A further objective of this invention is to automate the output of the portable high precision pressure measurement system and to allow for variable pressure measuring periods.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

SUMMARY OF THE INVENTION

To achieve the foregoing and other objectives and in accordance with the purposes of the present invention, as embodied and broadly described herein, the present invention provides for a means to check the accuracy of a differential pressure transducer used to monitor the depth of a liquid contained in a holding tank. Since the response of the monitoring transducer is temperature dependent, removing the monitoring transducer to a remote site for calibration would probably induce measuring error over and possibly above that which would result from taking no action with respect to calibration. Thus, it is desirable to check the monitoring transducer in place, and to achieve this end, the subject invention provides a portable system to measure the differential pressure and to provide for instrument stability by maintaining the portable system's pressure transducer at a specific temperature through the use of a temperature controlled environment.

DETAILED DESCRIPTION OF THE INVENTION

The subject invention, a precision pressure measurement box (PPMB) provides a means to check the accuracy of a differential pressure transducer used to monitor changes in the level of a liquid present in a holding tank and through these measurements therein, to determine if the holding tank is leaking. Identical quartz crystal pressure transducers are used in the system for monitoring the fluid level in the holding tank and in the precision pressure measurement box.

Figure 1:
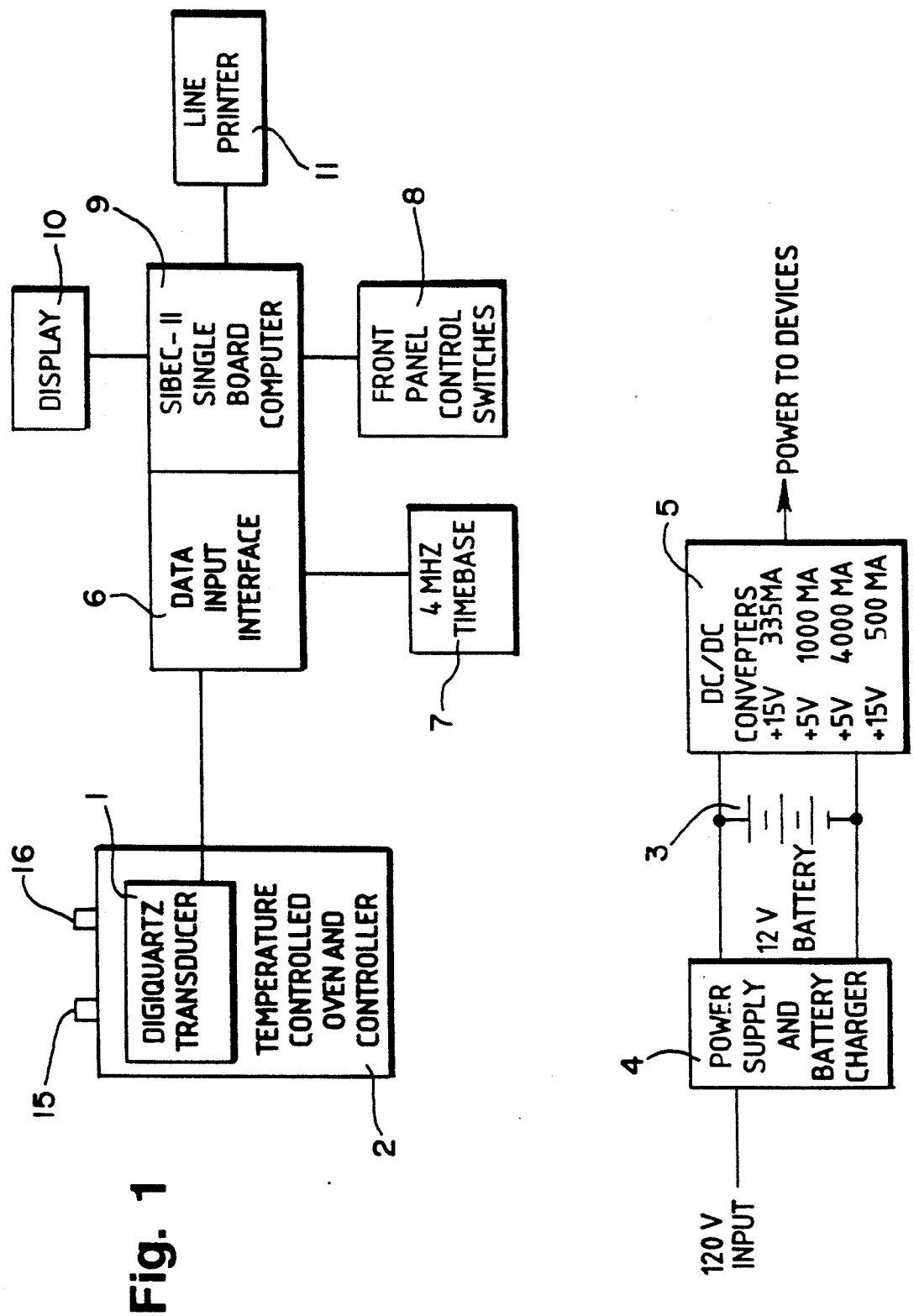
FIG. 1 represents a schematic of the various components of the invention.

FIG. 1 illustrates a block schematic of the PPMB. A quartz pressure transducer, 1, is used as the differential pressure transducer in the PPMB, where 15 and 16, of FIG. 1, represent the external high and low pressure ports respectively for providing the differential pressure to the quartz pressure transducer 1. The quartz pressure transducer, 1, serves as differential pressure reference for comparison with the differential pressure transducer installed in the holding tank monitoring system. Since the quartz pressure transducer, 1, would experience a shift in its zero-pressure frequency when exposed to varying temperatures and since once exposed to a cycling temperature, it would require several hours to stabilize, the quartz pressure transducer, 1, is housed in a temperature controlled oven, 2. The temperature controlled oven, 2, functions to keep the quartz pressure transducer, 1, within approximately 0.02 C of a specified temperature for a period of up to several years; this provides a stable ambient temperature environment for the quartz pressure transducer, 1, which serves to limit the shift in the zero-pressure frequency with time. The temperature controlled oven, 2, is powered by a series of two six volt batteries, 3, or in the alternative a single 12 volt battery. When disconnected from a line source of power, the batteries, 3, can provide sufficient power to the temperature controlled oven, 2, for approximately four hours of use without recharging. During periods of storage or use when line power is available, the batteries, 3, are charged by an integral battery charger, 4; however, in all of the modes of operation the batteries, 3, act as the source of power for the PPMB. The batteries, 3, continually supply 12 volts to four DC to DC converters, 5. The DC to DC converters, 5, in turn power the electrical devices of the PPMB at their required voltage and current levels. The DC to DC converters, 5, are all pulse width modulated switchers operating at about 80% efficiency for inputs ranging anywhere from 9 to 18 volts and having about 1% output voltage regulation.

The quartz pressure transducer, 1, relates the applied pressure to the transducers oscillation frequency, f, and the zero-applied pressure frequency, of, as follows:

$$P(pSi) = C\{1 - (f/fo)^2 + D[1 - (f/fo)^2]^2\} \text{ where } C = 92.5357 \text{ and } D = 0.04352$$

In addition to thermal variations, the zero-pressure frequency, fo can change slowly with time; however, since the change in the value of the frequency from zero pressure to the applied pressure is closely proportional to the current value of the-zero-pressure-fo the ratio f/fo remains approximately the same as fo changes. Thus, by updating fo on a regular basis the above equation continues to be very close to correct over a period of time.

The most important characteristic for the PPMB quartz pressure transducer, 1, to have is that it exhibit long term reproducibility through the range of pressures which it might experience in checking the response of the holding tank differential pressure transducer. This requires that the coefficient D in the above equation remain the same; on the other hand the C coefficient can be changed slightly if $\alpha_p$ in the relationship $f_p = f_o - \alpha_p$. fo varies with time, where fo is a constant and $f_p$ is the frequency of the crystal under an applied load of P psi where P is an applied pressure. Calibration of the PPMB quartz pressure transducer, 1, should be regularly checked using the same applied pressure each time, for example 10 psi, and the value of C should be updated as required in response to the changes experienced under the set load of 10 psi. These procedures should result in long term reliability for the quartz pressure transducer, 1.

Figure 2:
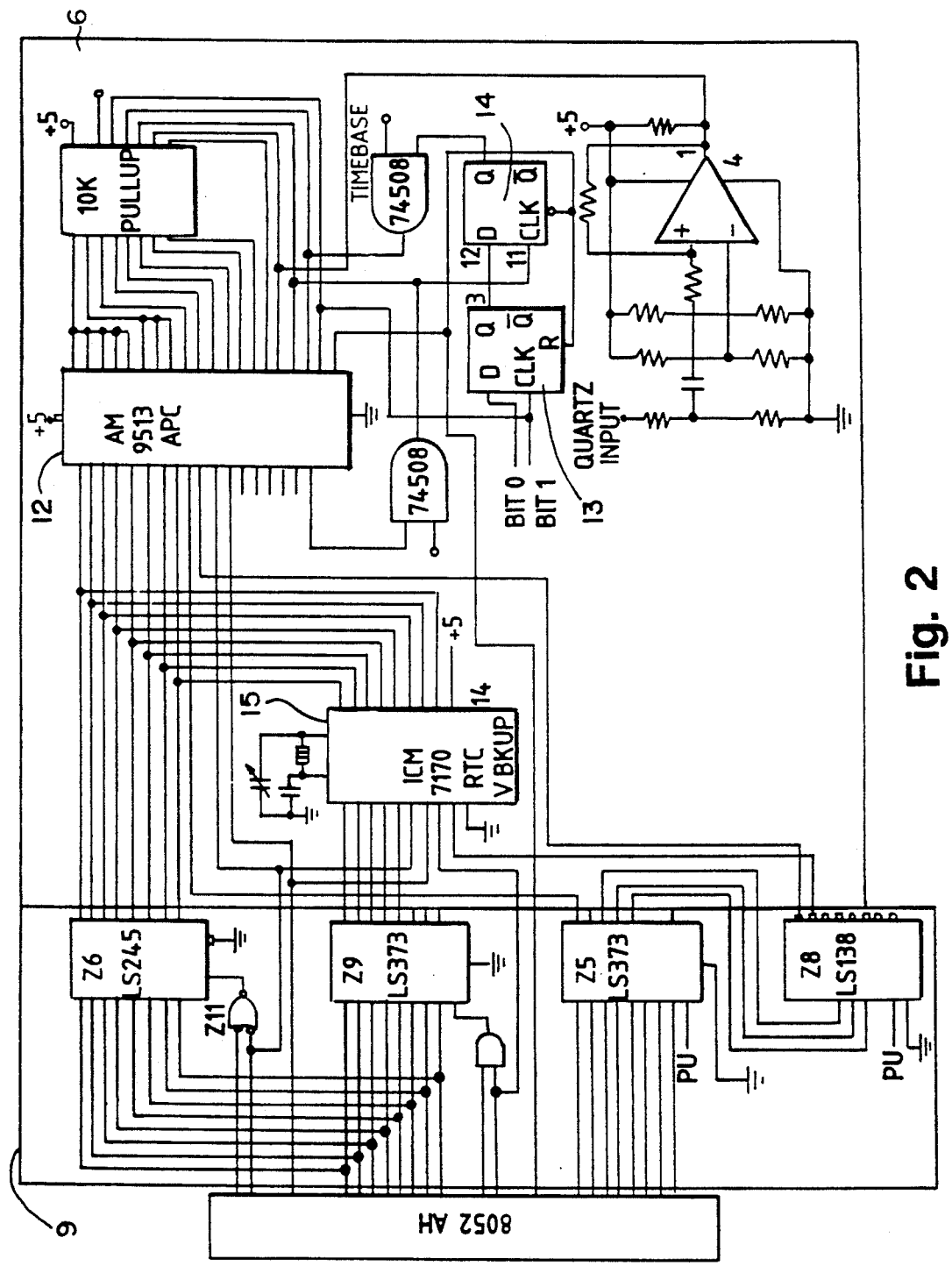
FIG. 2 depicts a schematic of the circuit board used to determine the frequency changes in the pressure differential transducer due to an applied pressure.

In the PPMB, the oscillation frequency of the quartz pressure transducer, 1, is determined using a 32 bit counter, 12 of FIG. 2, located in the data input interface, 6; this counter counts the response from a temperature controlled, highly stable, 4.0 MHz oscillator, 7, for an exact number of quartz pressure transducer periods. The frequency of the quartz pressure transducer use in the subject invention is approximately 36,000 Hz, and the setting for the time period over which the periods are to be counted is selected from a menu on the front control panel, 8. These settings include time periods of approximately 5, 10, 15, or 20 seconds.

The computer uses a SIBEC II single board computer, 9, which is capable of maintaining eight digits in its floating point calculations. The operator interface with the PPMB is via a push button menu accessed from the front panel control, 8. Information from the computer during menu selection or during pressure measurements is made via the vacuum florescent display, 10. The front panel control, 8, has four buttons: reset, menu, select, and start. Repeatedly pushing the menu button cycles the system through six items which prepare the PPMB to make a measurement: measurement identification, time for the measurement (5, 10, 15, or 20 seconds), display time and date, set time, set date, set new fo. Pressing the select button cycles the system through various sub-options associated with each option. The suboption is selected when one then depresses either the menu or start button. However, the start button should only be depressed when the PPMB is totally set up since it will then begin taking pressure measurements.

The line printer, 11, operates from a RS-232 signal from the single board computer, 9. Gating of the RS-232 signal confines the printer, 11, output to actual measurements as opposed to the florescent display, 10, which shows all of the RS-232 signal. The real time clock, 15 of FIG. 2, provides time and date readings which are outputted to the printer with each measurement.

FIG. 2 illustrates the components which make up the data input interface, 6, and the single board computer, 9 of FIG. 1. The system timing controller, 12, is used to count off a set number of quartz pressure transducer periods and to simultaneously count the 4.0 MHz clock, 7 of FIG. 1, to determine the time required for a set number of quartz pressure transducer periods to pass. The single board computer, 9, and the system timing controller, 12, an AMD9513A counter, together with the related circuitry accurately determine the frequency of the quartz pressure transducer. The computer, 9, sets up the counter, 12, and on the next edge transition of the quartz pressure transducer, 1, two counting tasks start: the high stability 4 MHZ clock, 7, is counted in one 32 bit portion of the system timing controller, 12, and a value in another portion of the system timing controller, 12, is counted down to zero via the quartz pressure transducer, 1, output. When the countdown to zero has been accomplished, the quartz pressure transducer has been counted for an exact number of periods and the 4.0 MHz clock has been counted accurately to ±1 cycle. So for a 20 second measurement, the measurement time is accurately known to 1 part in $8 \times 10(+7)$. Thus, within the system timing controller, 12, one counter counts a fixed number of quartz pressure transducer periods while the other counter, counting the 4 MHz clock, determines the time associated with the countdown of the quartz pressure transducer counter; this latter time will vary with the applied pressure. The counting is initiated by a series of commands and data transmissions from the single board computer, 9, to the system timing controller, 12, to initiate its simultaneous counting scheme. After this is complete, the single board computer, 9, writes a 1 to the D input of the left gate, 13, and then a "high" and a following "low" to the clock of the left gate, 13. This same pulse is also transmitted to the system timing controller, 12, which allows the counter countdown to begin when the next low-to-high quartz pressure transducer transition from the Fout terminal of the system timing controller, 12, occurs. Meanwhile, Q of left gate, 13, is now high so the right gate, 14, is set and awaiting a clock from this same Fout transition. Thus, the 4.0 MHz clock begins to count into the system timing controller at the very moment of the quartz pressure transducer wave transition. All counting stops when the countdown counter in the system timing controller, 12, goes low resetting the gates when the countdown is complete. This reset also generates an interrupt at the computer so the data can be read out. The real time clock, 15, is used to output a time and date reading independent of the system timing controller. The information from the real time clock, 15, is transmitted to the printer, 11, with each measurement.

The embodiments of the invention in which an exclusive property or privilege is claimed are defined as follows:

1. A pressure measuring system which measures the differential pressure between two points in a liquid column comprising:
   a quartz pressure transducer which incurs a change in frequency in response to a change in applied pressure;
   means for controlling the environmental temperature of said quartz pressure transducer;
   means for applying a differential pressure to said quartz pressure transducer;
   a data input interface where said data input interface is coupled to said pressure transducer and is responsive to an output from said pressure transducer;
   a time base coupled to said data input interface where said time base provides a stable clock for the pressure measuring system;
   computer means for coordinating command and data transfer to said data input interface and to a plurality of output devices, and for processing a data stream from said data input interface to produce a pressure measurement;
   visual display means for viewing a data stream representing data inputted and processed by said computer means where said visual display means is coupled and responsive to said computer means;
   printing means for printing the computed pressure measurements where said printing means is coupled and responsive to said computer means;
   control means for controlling the operation of the pressure measuring system where said control means is coupled to said computer means; and
   power means for supplying the electrical power to the pressuring measuring system where said power means is coupled to said time base, said computer means, said visual display means, and said temperature controlling means.

2. The pressure measuring system of claim 1 where said power means includes a plurality of DC to DC converters,
   a battery power supply coupled to said DC to DC converters where said battery power supply supplies power to the measuring system through said DC to DC converters,
   a battery charger coupled to said battery power supply which charges said battery power supply when a line power source is connected to said battery charger.

3. The pressure measuring system of claim 1 where said data stream includes data relating to said changing frequency response from said quartz pressure transducer in response to a changing differential pressure.

4. The pressure measuring system of claim 1 where said time base is a 4.0 MHz oscillator.

5. The pressure measuring system of claim 1 where said data input interface includes a counting means which counts the number of 4 MHz clock cycles occurring within a previously set number of pressure transducer oscillation periods,
   a real time clock which is coupled to said computer means and said printing means and which outputs a time and date for each measurement to said printing means,
   a system of gates which are coupled to said counting means and act to control the beginning of the counting sequence, and
   means for controlling the transmission of information to said computer means.

6. The pressure measuring system of claim 1 in which said control means includes a reset means for resetting the counters of the pressure measuring system,
   menu means for cycling through a series of set up conditions as part of said control means,
   select means for providing a series of suboptions for said menu means,
   start means for starting the pressure measurement system once said select means has been instituted.

7. A method for measuring the pressure differential between the pressure at the surface of a fluid column and the pressure at a specified depth in the fluid column comprising:
   receiving a plurality of pressure signals from the fluid column where said plurality of pressure signals combine to form the pressure differential;
   responding to changes in the pressure differential through changes in frequency of a quartz pressure transducer and generating an output signal in response thereto;
   controlling the environmental temperature of said quartz pressure transducer;
   receiving said quartz pressure transducer output signal at a data input interface together with an output signal generated by a time base oscillator;
   coordinating the output of said quartz pressure transducer with that of a time base oscillator and counting the number of periods in the output signal of the pressure transducer during a previously specified period of time as measured by said time base oscillator in order to generate an output pressure transducer frequency;
   receiving said output pressure transducer frequency at a computer which in turn acts on the data and converts it to a pressure measurement and outputs the measurement to a plurality of output devices.

8. The method as recited in claim 7, further comprising using a menu driven control device to input a set of conditions governing the pressure measurement.

9. The method as recited in claim 8, further comprising outputting the measurement data to a vacuum florescent display and to a line printer.

10. The method as recited in claim 9, further comprising using a battery system to provide the electrical power to maintain said pressure transducer at a specified temperature during all periods of operation.

11. The method as recited in claim 10, further comprising charging said battery system to prevent loss of battery power.

* * * * *